United States Patent
Wei

[11] Patent Number: 6,145,585
[45] Date of Patent: Nov. 14, 2000

[54] MOTOR HOUSING WITH INVERTEDLY DISPOSED T-GROOVES FOR QUICK DISSIPATION OF HEAT

[76] Inventor: Ta-Chuang Wei, No. 37, Alley 33, Lane 207, Tung-Nan Rd., Tali City, Taichung County, Taiwan

[21] Appl. No.: 09/247,929

[22] Filed: Feb. 11, 1999

[51] Int. Cl.[7] ...................................................... H02K 5/18
[52] U.S. Cl. ........................... 165/80.2; 165/183; 310/64
[58] Field of Search ................................... 165/80.2, 183; 310/64

[56] References Cited

U.S. PATENT DOCUMENTS

| | | | |
|---|---|---|---|
| 2,283,208 | 5/1942 | Houdry et al. ........................... | 165/183 |
| 3,160,132 | 12/1964 | Mowatt .................................... | 165/183 |
| 3,756,313 | 9/1973 | Beach ...................................... | 165/106 |

FOREIGN PATENT DOCUMENTS

| | | | |
|---|---|---|---|
| 1168929 | 4/1965 | Germany ................................ | 165/183 |
| 3102707 | 2/1999 | Germany ................................ | 165/183 |

*Primary Examiner*—Allen Flanigan
*Attorney, Agent, or Firm*—Rosenberg, Klein & Lee

[57] ABSTRACT

A cylindrical motor housing having a plurality of longitudinally extended substantially T-shaped radiating fins arranged in parallel and spaced around the periphery for dissipation of heat, and a plurality of invertedly disposed T-grooves defined between the T-shaped radiating fins for ventilation.

1 Claim, 4 Drawing Sheets

MOTOR HOUSING WITH INVERTEDLY DISPOSED T-GROOVES FOR QUICK DISSIPATION OF HEAT

BACKGROUND OF THE INVENTION

The present invention relates to a motor housing, and more specifically to such a motor housing which has a plurality of invertedly disposed T-grooves spaced around the periphery for quick dissipation of heat.

When a motor is operated, it produces heat. If heat cannot be efficiently carried away from the motor housing during the operation of the motor, the service life of the motor will be shortened. FIGS. 1 and 2 show a motor housing according to the prior art. As illustrated, the motor housing 10 has a plurality of longitudinally extended flat radiating fins 11 arranged in parallel and spaced around the periphery, and a plurality of longitudinal grooves 12 of substantially U-shaped cross section defined between the radiating fins 11. Because the radiating fins 11 have a flat configuration, they do not provide much heat dissipating area. Therefore, this structure of motor housing cannot efficiently dissipate heat during the operation of the motor. Another drawback of this structure of motor housing is that the user's hands may be injured by the topmost edges of the radiating fins when the motor housing is moved with the hands. Furthermore, the U-shaped longitudinal grooves cannot cause a rapid flow of air to efficiently carry heat away from the flat radiating fins.

SUMMARY OF THE INVENTION

According to one aspect of the present invention, the motor housing has a cylindrical shape, and a plurality of longitudinally extended substantially T-shaped radiating fins arranged in parallel and spaced around the periphery for dissipation of heat. According to another aspect of the present invention, a plurality of invertedly disposed T-grooves are defined between the T-shaped radiating fins for ventilation, so that heat can be quickly carried away from the T-shaped radiating fins.

DETAILED DESCRIPTION OF THE PREFERRED EMBODIMENT

Figure 1:
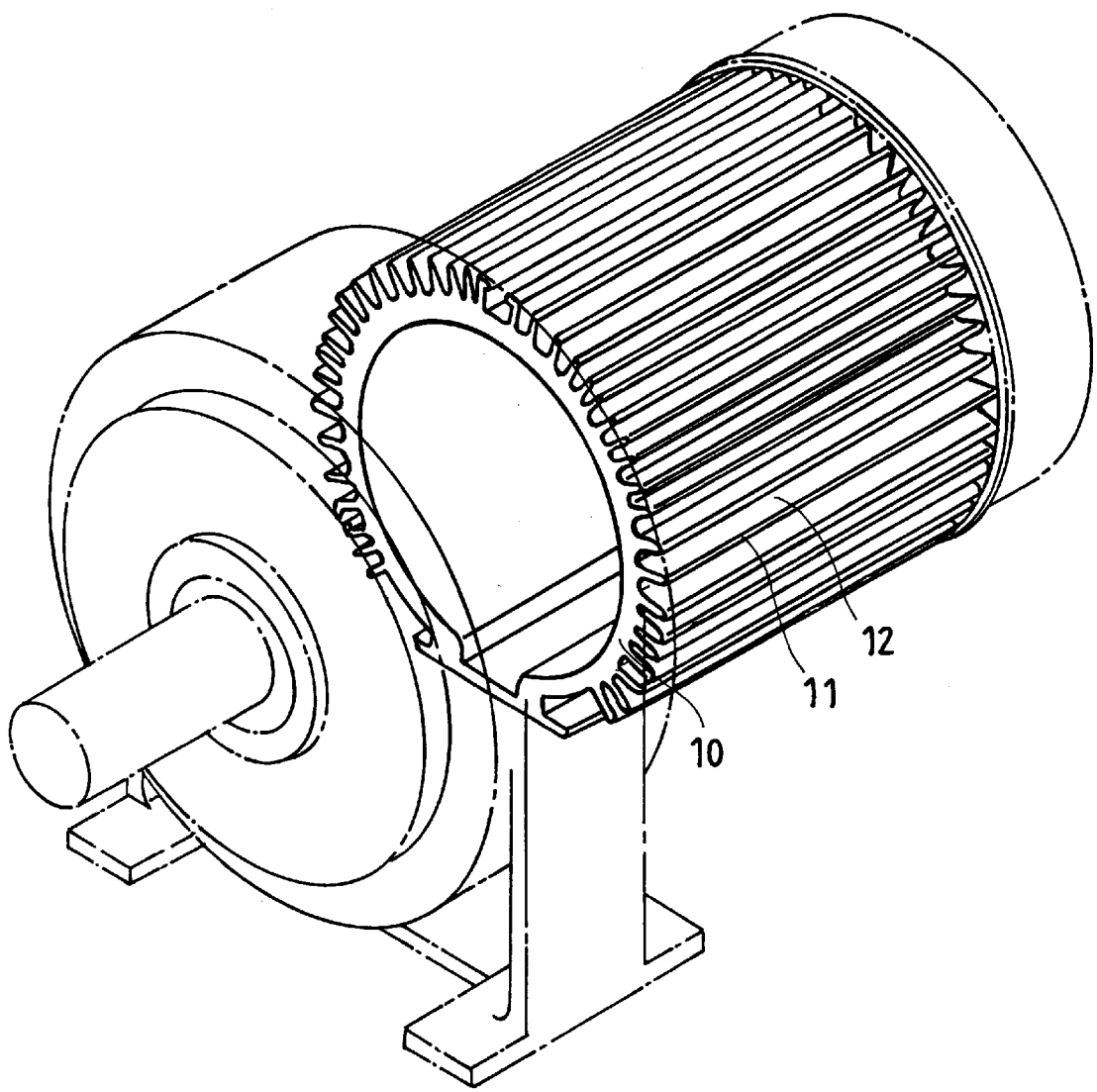
FIG. 1 is an elevational view of a motor housing according to the prior art.
Figure 2:
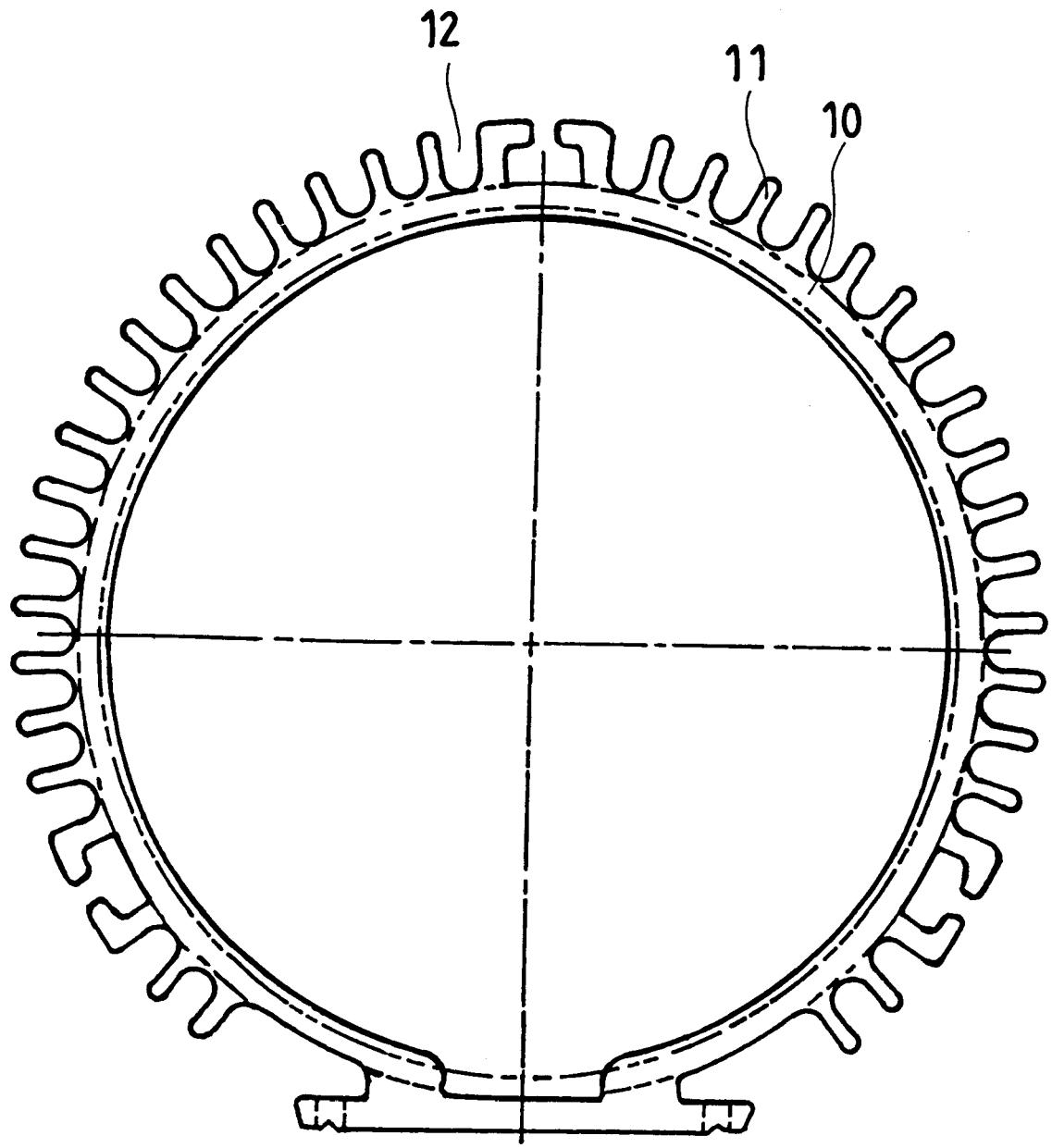
FIG. 2 is a cross sectional view of the motor housing shown in FIG. 1.
Figure 3:
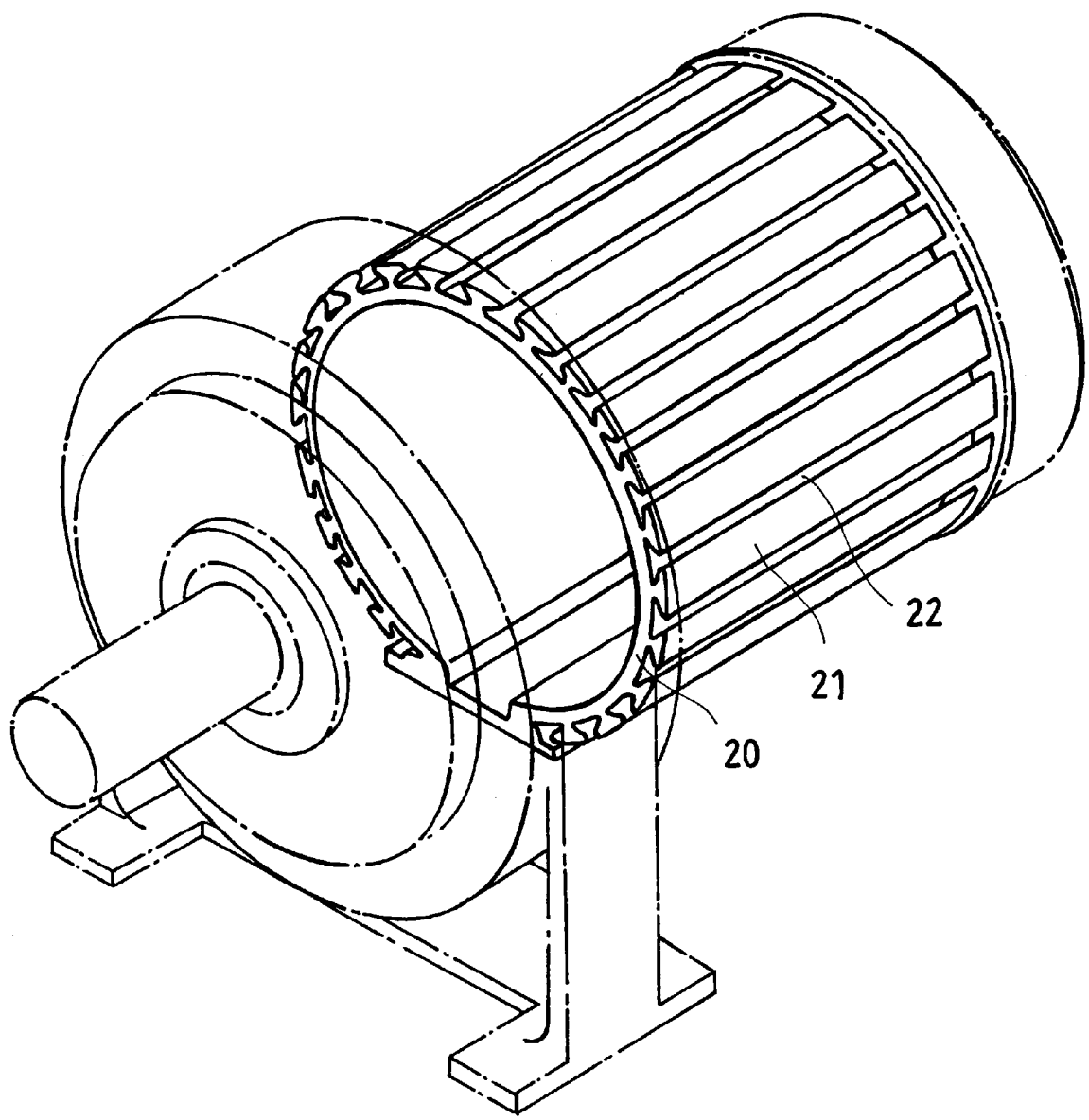
FIG. 3 is an elevational view of a motor housing according to the present invention.
Figure 4:
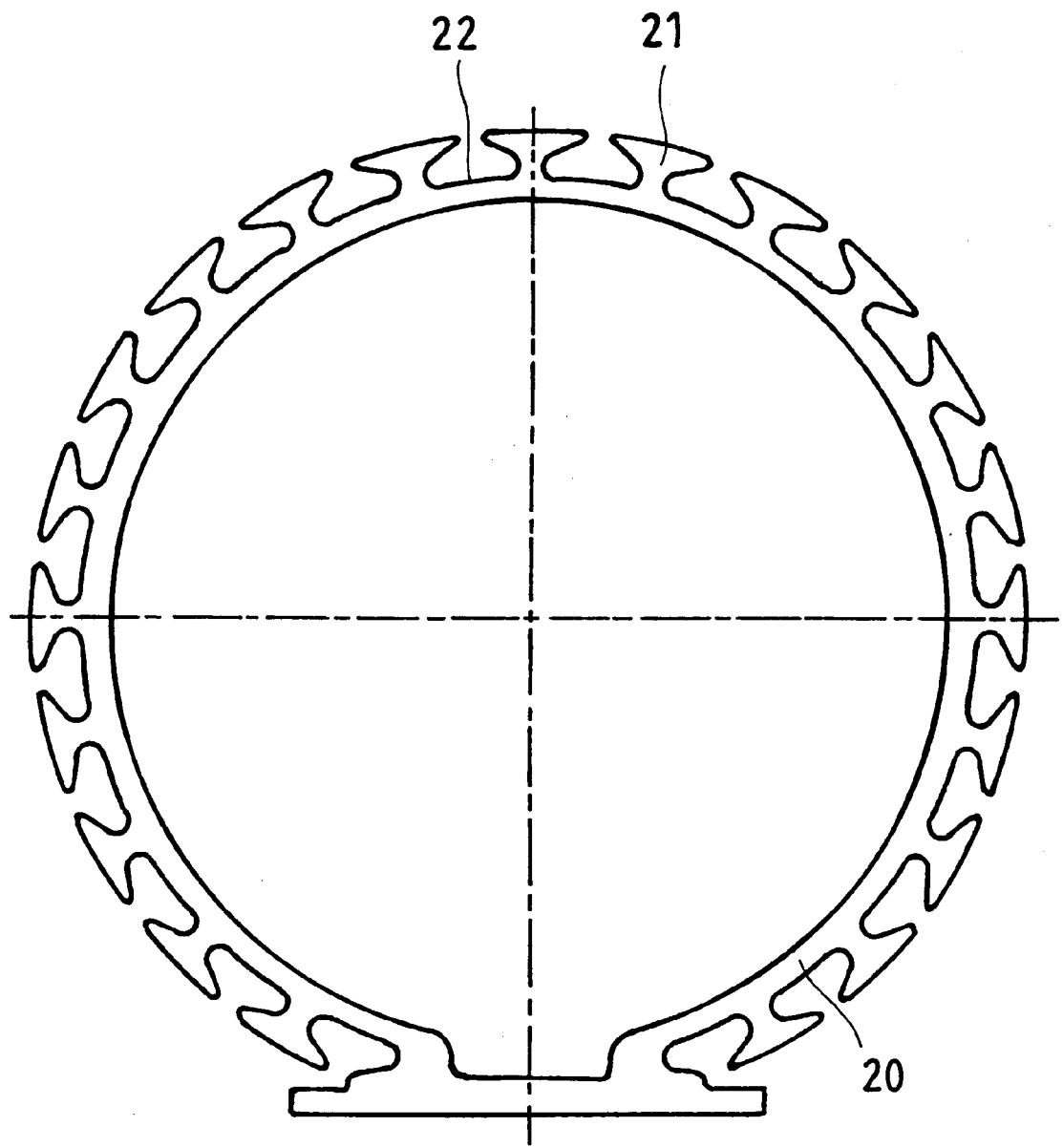
FIG. 4 is a cross sectional view of the motor housing shown in FIG. 3.

Referring to FIGS. 3 and 4, a motor housing 20 for a motor in accordance with the present invention has a cylindrical shape, a plurality of longitudinally extended substantially T-shaped (or more specifically, substantially dovetail-shaped) radiating fins 21 arranged in parallel and spaced around the periphery, and a plurality of invertedly disposed (substantially dovetail-shaped) T-grooves 22 defined between the radiating fins 21.

When the motor is operated, heat is quickly transmitted to the T-shaped radiating fins 21, and outside cooling air is guided through the invertedly disposed T-grooves 22 to carry heat away from the T-shaped radiating fins 21 efficiently.

As indicated above, the T-shaped radiating fins 21 greatly increase air contact area of the motor housing 20 for quick dissipation of air, and outside cooling air can be guided through the invertedly disposed T-grooves 22 to carry heat away from the T-shaped radiating fins 21 efficiently. Furthermore, the T-shaped radiating fins 21 have a respective flat top side. Because the T-shaped radiating fins 21 are made having a respective flat top side, the T-shaped radiating fins 21 do not hurt the hands when one move the motor housing 20 with the hands. The design of the T-shaped radiating fins 21 also makes the configuration of the motor housing 20 attractive.

What the invention claimed is:

1. A substantially cylindrical motor housing comprising:

a plurality of solid longitudinally extended radiating fins projecting radially therefrom;

each said radiating fin having a dovetailed sectional contour, adjacent ones of said radiating fins defining therebetween a longitudinally extended groove;

said groove having a sectional contour describing substantially an inverted configuration of said dovetailed sectional contour.

* * * * *